United States Patent [19]

Bula et al.

[11] 4,308,906

[45] Jan. 5, 1982

[54] NET-LIKE OR CHAIN-LIKE ANTI-SLIP DEVICE FOR A VEHICLE WHEEL

[75] Inventors: Karl Bula, Seuzach; Bruno Schaffner, Oetwil am See, both of Switzerland

[73] Assignee: Sulzer Brothers Limited, Winterthur, Switzerland

[21] Appl. No.: 201,817

[22] Filed: Oct. 29, 1980

[30] Foreign Application Priority Data

Nov. 6, 1979 [CH] Switzerland .......................... 9951/79

[51] Int. Cl.³ ............................................. B60C 27/00
[52] U.S. Cl. .................................. 152/219; 24/115 G; 24/249 R; 152/213 R; 152/221; 152/242
[58] Field of Search ............... 152/213 A, 213 R, 219, 152/217, 218, 233, 241, 242, 221, 222; 24/115 R, 115 G, 115 N, 116 R, 249 R, 249 LS; 248/410; 285/DIG. 3, 340

[56] References Cited

U.S. PATENT DOCUMENTS 3,934,633  1/1976  Bula ..................................... 152/221
4,111,251  9/1978  Bula ..................................... 152/219

Primary Examiner—William A. Powell
Assistant Examiner—Thomas Bokan
Attorney, Agent, or Firm—Kenyon & Kenyon

[57] ABSTRACT

The clamping means of the anti-slip device includes a pair of locking members for selectively clamping the overlapping wire ends of the wire in a manner so as to only permit movement in a sense of a shortening of the effective length of the wire. A pair of release members are actuated simultaneously by a frame so as to move the locking members from an inclined position in which the wires are clamped to an upright position in which the wires are free to move through the locking members. The clamping wire is secured within the helical spring forming the resilient pull element at a point diametrically opposite the clamping means. With the anti-slip device fitted onto a wheel and with the release members in a locking position, the locking members allow the clamping means to move relative to the wire ends only in the sense of a shortening of the effective length of the wire. With the release members and the locking members in the release position, the wire ends can move relative to the clamping means in the opposite direction. This anti-slip device can be readily fitted onto a wheel. Further, the device can be reliably secured in place with take-up being automatic.

10 Claims, 5 Drawing Figures

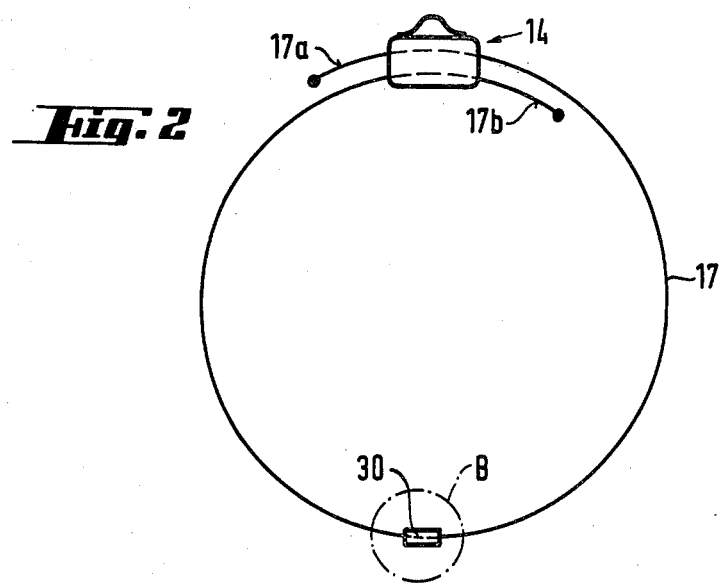
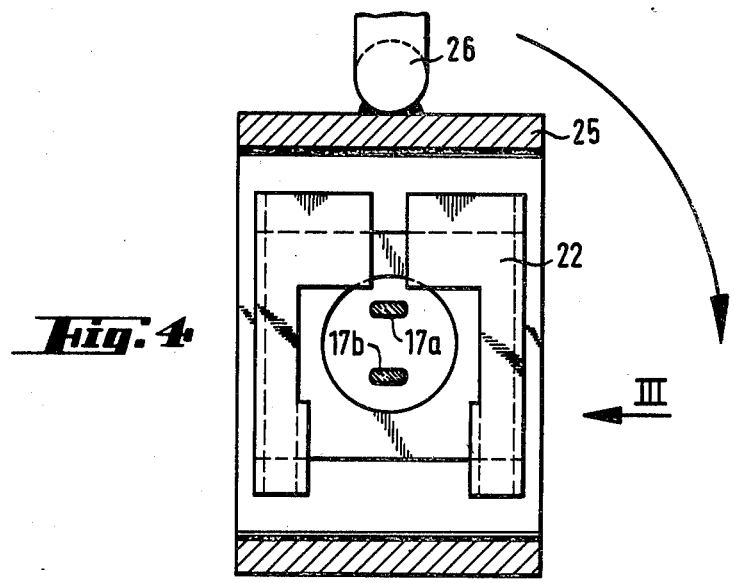
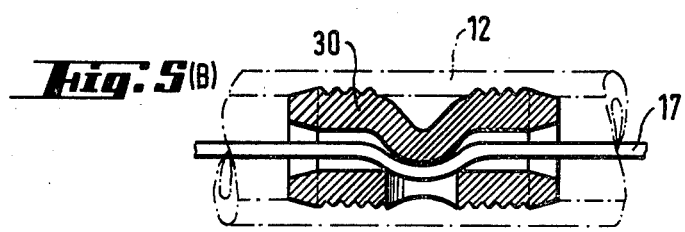

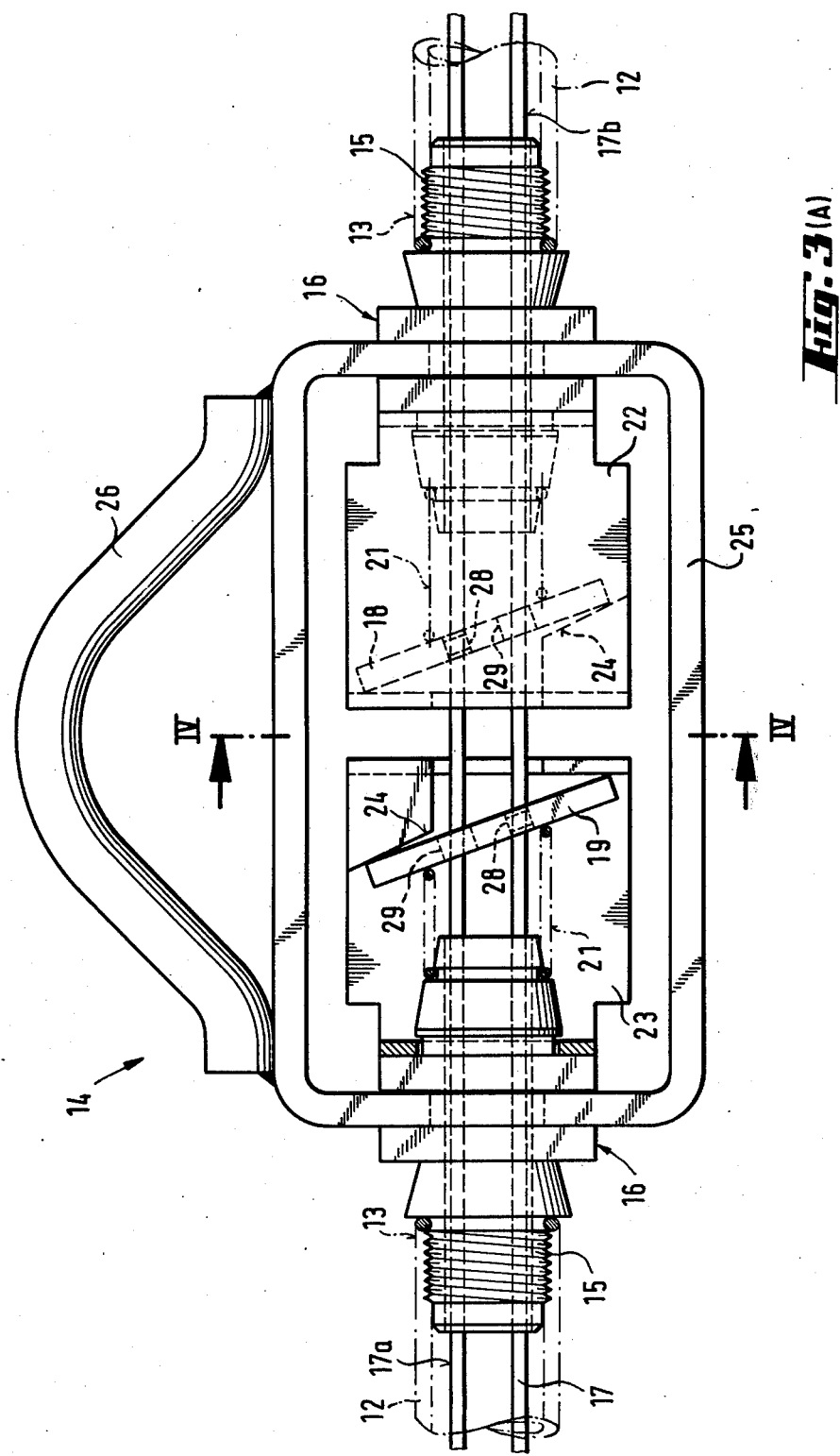

NET-LIKE OR CHAIN-LIKE ANTI-SLIP DEVICE FOR A VEHICLE WHEEL

This invention relates to a net-like or chain-like anti-slip device for a vehicle wheel.

Heretofore, various types of anti-skid devices have been known for fitting about a vehicle wheel, for example, to enhance traction under various weather conditions. Generally, in order to secure the anti-skid devices in place use has been made of various types of clamping devices. For example, as described in German Auslegeschrift No. 2 608 190, one known clamping means has employed a pull member in the form of a coil spring which extends peripherally of a vehicle wheel and a clamping wire which extends through the spring and has one end secured to a turnbuckle. However, it has been found that difficulties may occur in such clamping means when the anti-skid device is being fitted onto a wheel since the pull member has to be stretched in order to be pushed over the largest part of the wheel periphery. In this case, the pull member can only be stretched in one direction in relation to the clamping device since the wire end secured to the turnbuckle cannot yield in the opposite direction. Although the direction of pull is indicated on the clamping device by an arrow, some users may misunderstand the instruction.

Accordingly, it is an object of the invention to provide an anti-skid device with a pull element which can be stretched in both directions at least near a clamping means.

It is another object of the invention to provide an anti-skid device which can be readily fitted onto a vehicle wheel.

It is another object of the invention to eliminate a need for a special turnbuckle for clamping a net-like or chain-like anti-skid device in place.

Briefly, the invention provides a net-like or chain-like anti-slip device for fitting about a vehicle wheel, such as a tire. The device comprises a resilient pull element which extends over at least some of the wheel length, a clamping wire which extends peripherally of the wheel and a clamping means.

The clamping wire is secured to the pull element at an intermediate point of the wire and has two free ends disposed in overlapping relation.

The clamping means receives the free ends of the wire and is disposed diametrically opposite the point at which the wire is secured to the pull element relative to the wheel. The clamping means includes a locking member through which one of the wire ends extends and which is movable between an inclined position and an upright position relative to the wire end. When in the inclined position, the locking member clamps the wire end while allowing movement in a sense of shortening of the effective lengths of the wire. When in the upright position, the locking member releases the wire end. The clamping means also has a release member for moving the locking member between the inclined position and the upright position.

The clamping means also has a second locking member through which the other wire end extends. This second locking member is also movable between an inclined position relative to the wire end for clamping the wire end therein while allowing movement in a sense of shortening the effective length of the wire and an upright position releasing the wire end. A second release member is also provided for moving the second locking member between the two positions.

When the locking members of the clamping means are in the respective inclined positions, the clamping wire is clamped against movement in a sense of a lengthening of the effective length of the wire. However, the wire is free to move in a sense of shortening the effective length of the wire. When the release members move the respective locking members into the upright positions, the wire is unclamped and may move in either direction.

The clamping wire is secured to the pull element substantially at the mid-point so that there are two relatively mobile wire ends in the clamping means. Thus, the resilient pull element can be more readily stretched to the outer diameter of the wheel and the anti-slip device pushed thereover. The provision of the second locking member and associated release member means that, with the device assembled and with the second release member in the locking position, the second free end of the clamping wire acts in the sense of a shortening of the effective length. Thus, the anti-slip device can be readily clamped on the vehicle wheel while allowing an automatic take-up of any slack in the device.

The locking members are disposed in opposite relation to each other. Consequently, the clamping means may include an actuating element which couples the two release members together for actuating the release members simultaneously. Conveniently, the actuating element may be constructed in a manner of a frame which is disposed about the two release members and the two locking members so that, in contrast to the previously known devices, there is no need for a special turnbuckle.

These and other objects and advantages of the invention will become more apparent from the following detailed description taken in conjunction with the accompanying drawings wherein:

FIG. 2 illustrates a diagrammatic view of a clamping wire and clamping means according to the invention;

FIG. 3 illustrates a view of a clamping means according to the invention to a larger scale than that shown in FIG. 1;

FIG. 4 illustrates a view taken on line IV—IV of FIG. 3 with the locking member and other details not being shown; and FIG. 5 illustrates a sectional view of an intermediate point of the clamping wire as secured within the pull element in accordance with the invention.

Figure 1:
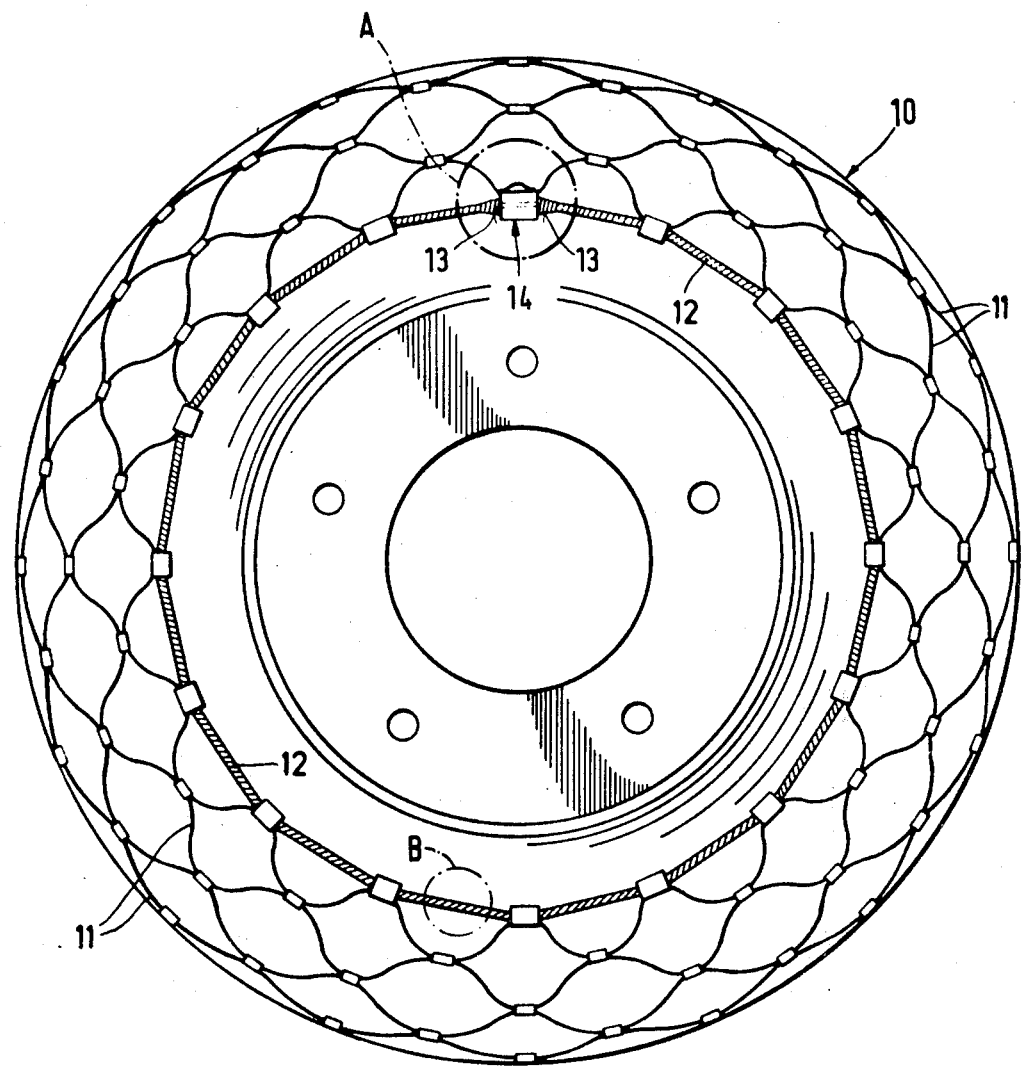
FIG. 1 illustrates a motor vehicle wheel fitted with an anti-slip device constructed in accordance with the invention.

Referring to FIG. 1, a vehicle wheel 10, such as a tire, has an anti-slip device 11 mounted thereon, for example for increasing traction on a roadway due to inclement weather conditions. The anti-slip device 11 includes a net-like or chain-like structure for fitting about the wheel 10. In addition, the device 11 has a resilient pull element 12 secured to one side of the net-like structure for biasing the structure circumferentially inwardly e.g. to tighten the net-like structure about the wheel 10. This pull element 12 is in the form of a helical spring having the ends 13 threaded onto a screw threaded extension 15 of each of two bush-like members 16 (see FIG. 3).

In addition, the anti-slip device 11 includes a clamping wire 17 of substantially rectangular cross-section which extends peripherally of the wheel within the resilient spring 12. The wire 17 is secured to the spring 12 at an intermediate point B of the wire 17 and has two free ends 17a, 17b disposed in overlapping relation (see FIG. 2). As shown in FIG. 3, the wire ends 17a, 17b extend through the two bush-like members 16.

The anti-slip device 11 also has a clamping means 14 receiving the free ends 17a, 17b of the wire 17. This clamping means 14 is disposed at a point A diametrically opposite the intermediate point B where the wire 17 is secured to the spring 12.

As shown in FIG. 3, the clamping means 14 includes a pair of locking members 18, 19 and a pair of release members 22, 23. The locking members 18, 19 are in the form of square discs, each formed with two apertures 28, 29 through which the respective wire ends 17a, 17b pass. Each locking member 18, 19 is movable between an inclined position as viewed in FIG. 3 relative to the respective wire ends 17a, 17b for clamping the respective wire end 17a, 17b therein and an upright position (not shown) relative to the wire ends 17a, 17b for releasing the respective wire ends 17a, 17b. To this end, the apertures 28 are of a size and shape such that with the locking members 18, 19 in the inclined position, the wire ends extending through the respective apertures 28 are prevented by a clamping action from moving in a direction opposite to that corresponding to a shortening of the clamping wire 17. However, the wire ends are allowed to move in a sense of shortening the effective length of the wire 17. The apertures 29 are larger than the apertures 28 and serve merely to guide the respective wire ends 17a, 17b. That is, the apertures 29 serve no clamping effect.

As shown in FIG. 3, a compression spring 21 bears on each locking member 18, 19 and rests, at the opposite end, against a conical portion of the adjacent bush-like member 16. In addition, each release member 22, 23 carries a wedge-shaped surface 24 which abuts a respective locking member 18, 19 on a side opposite a respective spring 21. Each release member 22, 23 is bent from spring sheet steel and is rotatably mounted on a respective bush-like member 16. Thus, upon rotation of the release members 22, 23 on the respective members 16, the respective wedge-shaped surface 24 causes the respective locking member 18, 19 to move from the inclined position to an upright position relative to the wire ends 17a, 17b so as to release the respective wire end therefrom. In the position shown in FIG. 3, the two release members 22, 23 are in a position in which the two locking members 18, 19 provide a locking effect, i.e. the wire ends 17a, 17b can move only in the sense of a shortening of the effective length of the wires 17.

As indicated, the locking members 18, 19 are disposed in opposite relation to each other.

Referring to FIG. 3, the clamping means 14 also includes an actuating element which couples the two release members 22, 23 together for simultaneous actuation. As indicated, the actuating element is in the form of a rectangular frame 25 which extends around the release members 22, 23. This frame 25 is rotatably mounted on the two bush-like members 16 and carries a wire stirrup 26 on the outside of the top longitudinal side, as viewed, for pivoting of the frame 25 through an angle of substantially 90° around the wire ends 17a, 17b. During such rotation, the two release members 22, 23 are moved about the same angle.

It is noted that during the pivoting movement of the frame 25 and the release members 22, 23, the wedge-shaped surfaces 24 move into a position relatively close to the apertures 28. At this time, the release members 22, 23 are in a release position, i.e. the wire ends 17a, 17b can move in the sense of a lengthening of the wires 17 since the locking members 18, 19 are inoperative in this position.

Referring to FIG. 5, a tubular member 30 is disposed within the spring 12 at the intermediate point B (see FIG. 1) and has the wire 17 secured therein in a non-releasable manner. As indicated, the tubular member 30 is made of a short metal tube which is deformed by means of a ram-like or stamp-like tool so that the wire 17 is non-releasably retained therein. In addition, the member 30 has a lightly indented groove-threaded shaping on the outside in which the turns of the spring 12 can engage when the wire 17 with the tubular member 30 thereon has been pulled into the spring 12.

It is to be noted that the clamping device 14 is disposed on the inside of the anti-slip device 11. Conveniently, the anti-slip device 11 has a similar clamping means on the outside (not visible in the drawing) of the wheel. Alternatively, in some circumstances, a non-resilient end ring, such as a ring of constant length, can be used on the outside of the wheel 10.

It is further noted that the stirrup 26 may be used to show a user of the anti-slip device 11 whether the device has been properly assembled. Specifically, when the stirrup 26 is in the position as shown in FIG. 1, i.e. extending parallel to the plane of the vehicle wheel 10, the device 11 has been assembled properly since the release members 22, 23 are in a locking position and the locking members 18, 19 are operative, i.e. are in the inclined positions indicated in FIG. 3. When the frame 25 is pivoted clockwise, as viewed in FIG. 4, the stirrup 26 moves into a position away from the wheel. This indicates to the user that the release members 22, 23 are in a release position and that the anti-slip device 11 which has been placed on the wheel 10 is not yet in the operative state since the locking members 18, 19 are still in an inoperative position.

What is claimed is:

1. A net-like anti-slip device for fitting about a vehicle wheel, said device comprising
   a resilient pull element extending over at least some of the wheel length;
   a clamping wire extending peripherally of the wheel, said wire being secured to said pull element at an intermediate point of said wire and having two free ends disposed in overlapping relation; and
   a clamping means receiving said free ends of said wire therein and being disposed diametrically opposite said intermediate point relative to the wheel, said clamping means including a first locking member having one of said wire ends extending therethrough and being movable between an inclined position relative to said one wire end clamping said one wire end therein while allowing movement in a sense of shortening the effective length of said wire and an upright position relative to said one wire end releasing said one wire end therefrom, a first release member for moving said locking member between said positions, a second locking member having the other of said wire ends extending therethrough and being movable between an inclined position relative to said other wire end clamping said other wire end therein while allowing movement in a sense of shortening the effective length of said wire and an upright position relative to said other wire end releasing said other wire end therefrom, and a second release member for moving said second locking member between said positions.

2. A net-like anti-slip device as set forth in claim 1 wherein said locking members are disposed in opposite relation to each other.

3. A net-like anti-slip device as set forth in claim 1 wherein said clamping means further includes an actuating element coupling said release members together for actuating said release members simultaneously.

4. An anti-slip device for a vehicle wheel, said device comprising
   a net-like structure of for fitting about a wheel;
   a resilient pull element secured to one side of said net-like structure for biasing said structure circumferentially inwardly about a wheel;
   a clamping wire secured to said pull element at an intermediate point of said wire and having two free ends disposed in overlapping relation; and
   a clamping means receiving said free ends of said wire therein and being disposed diametrically opposite said intermediate point relative to the wheel, said clamping means including a first locking member having one of said wire ends extending therethrough and being movable between an inclined position relative to said one wire end clamping said one wire end therein and an upright position relative to said one wire end releasing said one wire end therefrom, a first release member for moving said locking member between said positions, a second locking member having the other of said wire ends extending therethrough and being movable between an inclined position relative to said other wire end clamping said other wire end therein and an upright position relative to said other wire end releasing said other wire end therefrom, and a second releaed member for moving said second locking member between said positions.

5. An anti-slip device as set forth in claim 4 wherein said pull element is a helical spring and said clamping wire extends through said spring.

6. A net-like anti-slip device as set forth in claim 5 which further comprises a tubular member within said spring at said intermediate point with said wire secured therein in nonreleaseable manner.

7. A net-like anti-slip device as set forth in claim 4 wherein said wire has a rectangular cross-section at said ends.

8. A net-like anti-slip device as set forth in claim 4 wherein said clamping means further includes an actuating element coupling said release members together for actuating said release members simultaneously.

9. A net-like anti-slip device as set forth in claim 8 wherein said actuating element is rotatable relative to said pull element to rotate said release members relative to said wire ends to cause said locking members to move between said positions thereof.

10. A net-like anti-slip device as set forth in claim 9 wherein said actuating element includes a stirrup thereon for rotation thereof, said stirrup being positioned in a plane parallel to the wheel with said locking members in said inclined positions thereof.

* * * * *

UNITED STATES PATENT AND TRADEMARK OFFICE
CERTIFICATE OF CORRECTION

PATENT NO. : 4,308,906
DATED : January 5, 1982
INVENTOR(S) : KARL BULA, ET AL

It is certified that error appears in the above—identified patent and that said Letters Patent is hereby corrected as shown below:

Column 1, line 57, change "lengths" to --length--

Column 6, line 5, after "and" change "releaed" to --release--

Signed and Sealed this

Twentieth Day of April 1982

|SEAL|

Attest:

GERALD J. MOSSINGHOFF

Attesting Officer — Commissioner of Patents and Trademarks